United States Patent [19]

Yeomans, Jr.

[11] Patent Number: 4,861,053
[45] Date of Patent: Aug. 29, 1989

[54] SPHERICAL SUPPORT APPARATUS MOVABLE OVER PLANE SURFACES

[76] Inventor: Arthur S. Yeomans, Jr., 16 Ridgewood Ave., Madison, Conn. 06443

[21] Appl. No.: 205,834

[22] Filed: Jun. 13, 1988

[51] Int. Cl.⁴ ............................................. A63G 25/00
[52] U.S. Cl. ...................................... 280/205; 180/21; 180/342; 280/78; 280/210; 280/213; 280/DIG. 7; 305/19; 446/458
[58] Field of Search ................. 280/205, 206, 213, 78, 280/210, DIG. 7; 180/74; 305/19; 446/437, 458

[56] References Cited

U.S. PATENT DOCUMENTS 1,394,328  10/1921  Miller ........................... 280/DIG. 7
2,104,636   1/1938  Burcham ............................ 446/458

FOREIGN PATENT DOCUMENTS 516943   1/1931  Fed. Rep. of Germany ...... 446/458
2286044  4/1976  France ................................ 280/205
21468    of 1903  United Kingdom ................ 280/213

Primary Examiner—Kenneth R. Rice
Attorney, Agent, or Firm—Bachman & LaPointe

[57] ABSTRACT

A spherical element is disclosed having an external pivotably mounted bail counterbalance by an internal counterweight where the sphere is operable over plane surfaces and water supporting a variety of counterbalanced instrumentalities upon the bail and maintained upright by the counterweight when the spherical unit is moving, as well as when at rest.

9 Claims, 2 Drawing Sheets

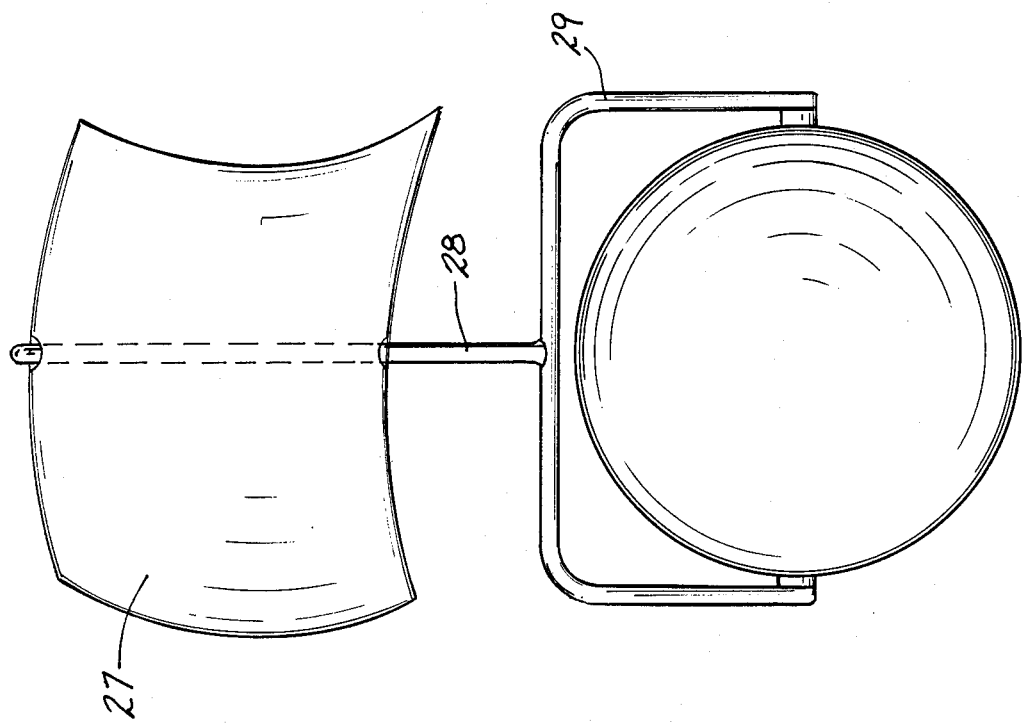
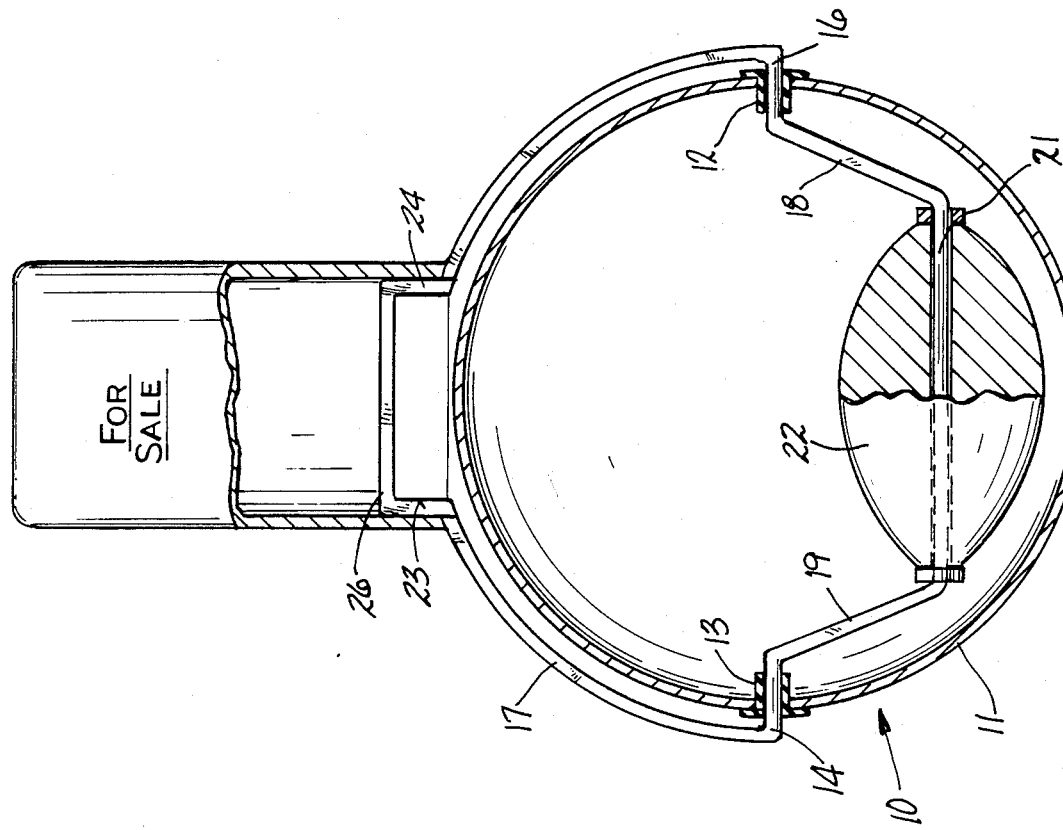

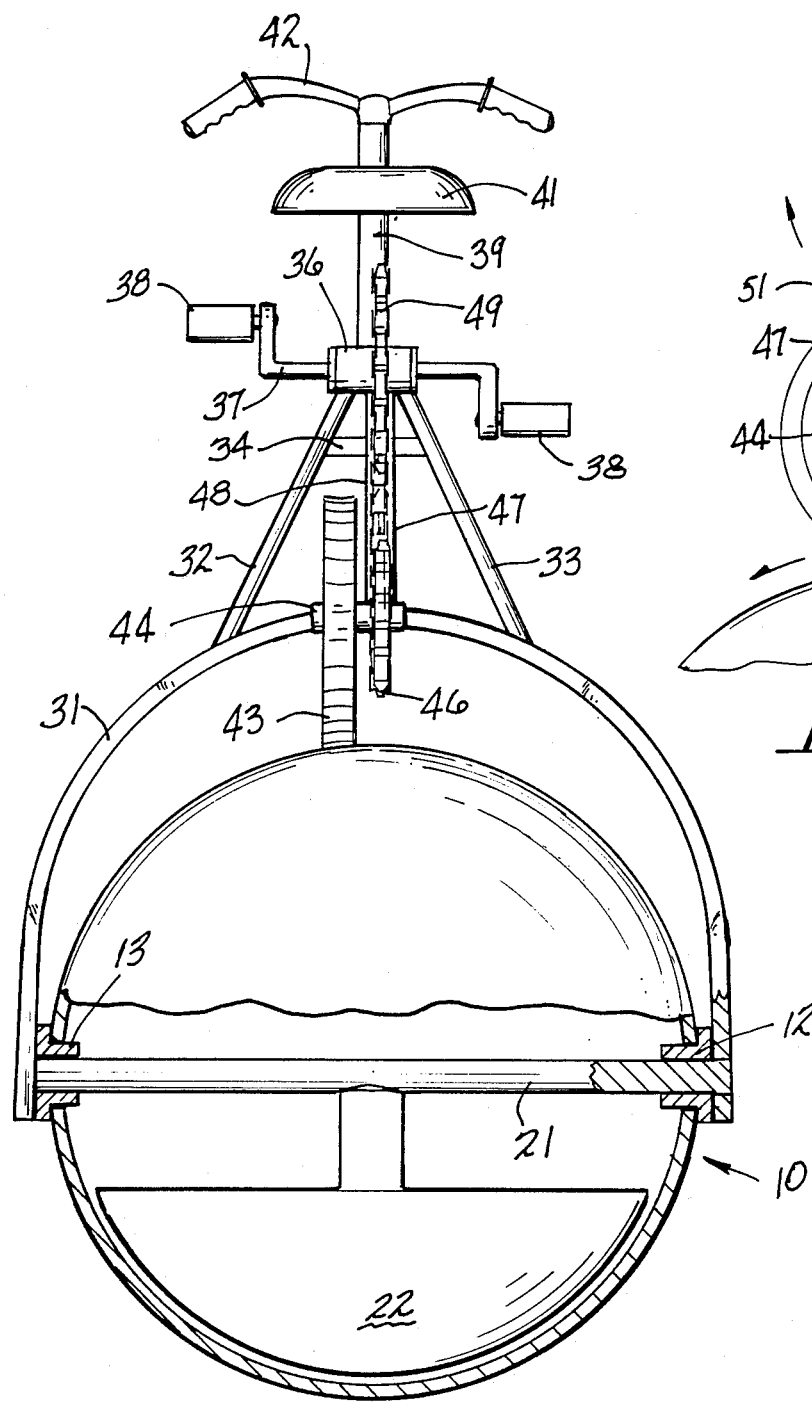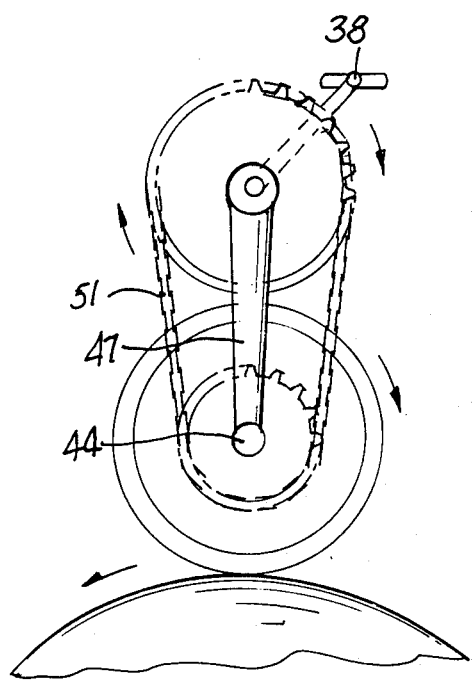
FIG-2
FIG-3

SPHERICAL SUPPORT APPARATUS MOVABLE OVER PLANE SURFACES

BACKGROUND OF THE INVENTION

The present invention relates to a land vehicle and, in particular, to a land vehicle whose main body is a hollow sphere having a continuous external surface defining a skin.

Numerous prior art devices involve the basic spherical structure and includes various internal mechanisms, such as internal combustion engines and counterbalanced power means driven manually and electrically.

Representative examples of typical prior art devices are disclosed in U.S. Pat. Nos. 4,381,620 issued May 3, 1983 to Panzarella, 4,386,787 issued June 7, 1983 to Maplethorpe et al., 4,501,569 issued Feb. 26, 1985 to Clark Jr. et al. and 4,579,336 issued Apr. 1, 1986 to Morin.

The U.S. Pat. No. 4,381,620 reference shows a standard 32 supporting a transparent sphere 12 in gimbal-like fashion where the sphere houses a novelty item 20 free to move about within the sphere on a spindle 22.

The U.S. Pat. No. 4,386,787 reference shows a spherical vehicle 10 with an internal body support mounted pivotably and driven by pedals 114 connected to a friction wheel 120 engaging the internal surface of the sphere.

The U.S. Pat. No. 4,501,569 reference shows a spherical unit having an internal power unit with a means for steering accomplished by changing the angular position of a suspended mass 14.

The U.S. Pat. No. 4,579,336 reference shows a cage-like spherical, recreational vehicle which includes a body support suspended on a transverse shaft with disk brakes 28 operable to steer the unit.

While many of these disclosures are in the novelty or amusement category and have varied degrees of utility, none show or suggest a spherical vehicle having external attachments.

SUMMARY OF THE INVENTION

Therefore, it is a primary purpose of the present inventio to provide a hollow spherical structure having a pivotably mounted external bail forming a foundation for various bail attachments where the bail and its attachments are counterbalanced by an internal counterweight insuring that the bail attachments remain upright when the sphere is moving or is at rest.

It is a further feature of the invention to provide a spherical element which is waterproof.

A further feature of the invention is the provision of a spherical vehicle of the class described wherein the bail means supports a unicycle and the unicycle is in frictional driving contact with the external skin of the sphere.

A further feature of the invention is the provision of a bail means pivotably mounted with respect to the major diameter of the sphere, counterbalanced by an internal counterweight to maintain bail attachments, such as a sail or advertising indicia in a generally upright position as the sphere moves over a plane surface including water or when the sphere is at rest.

A further feature of the invention is the provision of a counterweight that is rotatably mounted and pivotal relative to the sphere.

A still further feature of the invention is the provision of a counterweight that is fixed to a support means while remaining pivotal relative to the sphere.

A further feature of the invention is the provision of a flexible skin on the sphere which can be deflected or dimpled inwardly momentarily whereby an internal surface of the skin engages the counterweight frictionally.

In situations where the counterweight is fixed to its support means such momentarily frictional engagement creates a braking action on a moving sphere.

In situations where the counterweight is rotatably mounted to its support means, such momentary deflection tends to drive (rotate) said counterweight.

In both situations the momentary contact between the internal surface of the skin and the counterweight does not interfere in a substantial way with the counterweight's ability to keep the bail and its attachments upright.

An apparatus embracing certain features of the invention may comprise a sphere element having continuous external skin, an external bail pivotably mounted on said spherical element, an extension of said bail disposed within the spherical element, a counterweight fixed to said extension and support means connected to the bail serving as a foundation for fixing various instrumentalities to said bail whereby said instrumentalities are maintained upright by said counterweight when the spherical element is moving over a plane surface including water or is at rest.

Other features and advantages of the present invention will become more apparent from an examination of the succeeding specification when read in conjunction with the appended drawings, in which:

BRIEF DESCRIPTION OF THE DRAWINGS

FIG. 1 is a vertical section through a support apparatus illustrating the basic principles of the present invention, FIG. 2 is a vertical section of a modification of the present invention wherein a unicycle is fixed to the exterior of the sphere, FIG. 3 is an elevational view of a portion of the right side of FIG. 2, and FIG. 4 is a view similar to FIG. 1 showing a sail supported by the external bail means.

DETAILED DESCRIPTION

Referring in detail to the drawings and, in particular to FIG. 1, the reference numeral 10 designates a sphere element having a continuous external surface or skin 11.

Diametrically opposed sleeves 12 and 13 fixed to the external skin 11 provide bearings for stub shafts 14 and 16.

External ends of the stub shafts 14 and 16 are connected to a bail means 17. The opposed ends of the stub shafts are fixed to crank arms 18 and 19, in turn, connected to a transverse shaft 21 supporting a counterweight 22.

Thus, the crank arms 18 and 19 form an internal extension to external bail means 17 via stub shafts 14 and 16 and are rotatable relative to the sphere 10 in sleeves 12 and 13.

In some embodiments of the invention the counterweight 22 is fixed to its support means, i.e. fixed to shaft 21.

In other embodiments the counterweight is rotatably mounted to the shaft 21.

Frequently the skin 11 of the sphere 10 is flexible, in the fashion of a beach ball, such that as the sphere moves over irregular terrain the skin is subject to momentary inward dimpling or inward deflection.

This occurrence causes the internal surface of the skin 11 to contact the counterweight 22 as shown in dotted lines in FIG. 1.

When the counterweight 22 is fixed to the shaft 21 a momentary braking action of the moving sphere occurs.

When the counterweight 22 is rotatably mounted on the shaft 21 no appreciable braking action develops and the contact tends to drive (rotate) the counterweight on the shaft 21.

In both situations, in view of the momentary nature of the inward deflection of the skin 11, there is no substantial interference with the ability of the counterweight 22 to maintain the bail means 17 in an upright position.

It is desirable to provide suitable labyrinth packing or other seal means between stub shafts 14 and 16 and the sleeves 12 and 13 to maintain watertightness of the interior of the sphere 10 when the apparatus is operated on water.

A support means fixed to the bail defines upright arms 23 and 24 joined by cross arm 26 providing a foundation for various instrumentalities, such as advertising indicia fixed to the ball means via the support means as shown in FIG. 1.

FIG. 4 shows an alternative embodiment in which a conventional, wind driven sail 27 is supported on a mast 28, in turn, connected to and supported by external bail means 29.

Referring now to FIG. 2 external bail 31 supporting legs 32 and 33 stiffened by a cross arm 34 defines sprocket support means supporting housing 36, in turn, enclosing bearings for pedal shaft 37 driven by pedals 38.

A post 39 projects upwardly from the housing 36 providing a base for a body support or seat 41 and handlebars 42.

Basically, the external structure supported on the bail means 31 defines a unicycle which includes a wheel means 43 in frictional contact with the external skin of the spherical element. The wheel means 43 is carried by stub shaft 44 which also supports tooth gear 46. The stub shaft is supported or suspended from housing 36 by vertical straps 47 and 48.

Power is supplied to the friction wheel 43 by virtue of upper toothed gear 49 (keyed to shaft 37) through link chain 51 in well-known fashion.

Thus, when the pedals 38 are operated, clockwise or counterclockwise, the friction wheel 43 rotates to drive the spherical element along various planar surfaces. Balancing and steering is achieved, with probably an additional degree of difficulty, in much the same fashion as one balances and steers a conventional unicycle operating directly on a plane surface.

It is anticipated that a wide variety of modifications can be devised utilizing the interally counterbalanced sphere and external bail assembly without departing from the spirit and scope of the present invention.

For example, one may elect to mount parallel bars, weathervanes, mannequins, dolls, targets, small windmills and other novelty items upon the exterior bail means.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A support apparatus movable over plane surfaces comprising:
   a hollow spherical element having a continuous, flexible external skin,
   an external bail pivotably supported by said sphere,
   an extension of said bail being disposed within said spherical element,
   a counterweight fixed to said extension, and,
   a unicycle fixed to said bail making a driving connection with said external skin, said counterweight being spaced from said skin whereby a momentary indentation or deflection of said skin creates frictional contact between the skin and the counterweight causing momentary imbalance to said unicycle.
   a counterweight pivotally mounted to said extension, and,
   permanent support means on said bail serving as a foundation for fixing various instrumentalities to said support means whereby said instrumntalities are maintained in an upright position by said counterweight when said spherical element is moving over said plane surface or at rest, said external skin being flexible whereby a momentary indentation of said skin makes frictional contact with said counterweight to create a momentary driving connection therewith.

2. A support apparatus movable over plane surfaces comprising:
   a hollow spherical element having a continuous external skin,
   an external bail pivotally supported by said spherical element,
   an extension of said bail disposed within said spherical element,
   a counterweight fixed to said extension, and,
   permanent support means on said bail serving as a foundation for fixing various instrumentalities to said support means whereby said instrumentalities are maintained in an upright position by said counterweight when said spherical element is moving over said plane surface or at rest, said external skin being flexible whereby a momentary indentation of said skin makes frictional contact with said counterweight to create a momentary braking action of a moving spherical element.

3. The apparatus of claim 2 in which a snail means is fixed to said support means.

4. The apparatus of claim 2 in which an advertising indicia is fixed to said support means.

5. The apparatus of claim 2 in which power means is fixed to said support means.

6. A support apparatus movable over plane surfaces comprising:
   a hollow spherical element having a continuous external skin
   an external bail pivotally supported by said spherical element
   an extension of said bail disposed within said spherical element, a counterweight pivotally mounted to said extension, and, permanent support means on said bail serving as a foundation for fixing various instrumentalities to said support means whereby said instrumentalities are maintained in an upright position by said counterweight when said spherical element is moving over said plane surface or at rest, said external skin being flexible whereby a momentary indentation of said skin makes frictional contact with said counterweight to create a momentary driving connection therewith.

7. The apparatus of claim 6 in which a snail means is fixed to said support means.

8. The apparatus of claim 6 in which an advertising indicia is fixed to said support means.

9. The apparatus of claim 6 in which power means is fixed to said support means.

* * * * *

UNITED STATES PATENT AND TRADEMARK OFFICE
CERTIFICATE OF CORRECTION

PATENT NO. : 4,861,053

DATED : August 29, 1989

INVENTOR(S) : ARTHUR S. YEOMANS, JR.

It is certified that error appears in the above-identified patent and that said Letters Patent is hereby corrected as shown below:

In Column 1, lines 45 and 46, change "inventio" to --invention--.

In Column 3, line 26, change "ball" to read --bail--.

In Column 4, delete lines 21 through 32.

In Column 4, line 52, delete "snail" and insert --sail--.

In Column 4, line 65, after "element," start a paragraph.

In Column 4, line 66, after "and," start a new paragraph.

In Column 6, line 1, change "snail" to --sail--.

Signed and Sealed this

Tenth Day of July, 1990

Attest:

HARRY F. MANBECK, JR.

*Attesting Officer*  *Commissioner of Patents and Trademarks*